United States Patent
Dlala et al.

(10) Patent No.: US 10,158,263 B2
(45) Date of Patent: *Dec. 18, 2018

(54) MOTOR COOLING SYSTEM UTILIZING AXIAL COOLING CHANNELS

(71) Applicant: Atieva, Inc., Menlo Park, CA (US)

(72) Inventors: Emad Dlala, Pleasanton, CA (US); Richard J. Biskup, Sunnyvale, CA (US); David Moseley, Menlo Park, CA (US); Aberto Bassanese, Foster City, CA (US); Balaji Maniam, Fremont, CA (US); Jeremy Mayer, Mountain View, CA (US)

(73) Assignee: ATIEVA, INC., Newark, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 15/239,002

(22) Filed: Aug. 17, 2016

(65) Prior Publication Data

US 2018/0054097 A1 Feb. 22, 2018

Related U.S. Application Data

(63) Continuation-in-part of application No. 15/238,807, filed on Aug. 17, 2016.

(51) Int. Cl.
*H02K 9/19* (2006.01)
*H02K 1/20* (2006.01)
*H02K 1/16* (2006.01)
*H02K 15/02* (2006.01)

(52) U.S. Cl.
CPC .............. *H02K 1/20* (2013.01); *H02K 1/16* (2013.01); *H02K 9/19* (2013.01); *H02K 15/024* (2013.01)

(58) Field of Classification Search
CPC .. H02K 9/00; H02K 9/08; H02K 9/10; H02K 9/12; H02K 9/19; H02K 9/197; H02K 9/22; H02K 19/10; H02K 19/11; H02K 19/16; H02K 19/24; H02K 1/12; H02K 1/20; H02K 1/32; H02K 15/00; H02K 15/0012
See application file for complete search history.

(56) References Cited

U.S. PATENT DOCUMENTS

| 1,448,700 | A | | 3/1923 | Seidner | |
|---|---|---|---|---|---|
| 2,975,309 | A | * | 3/1961 | Seidner | H02K 9/197 174/DIG. 20 |
| 3,675,056 | A | * | 7/1972 | Lenz | H02K 9/20 174/DIG. 19 |
| 5,189,325 | A | * | 2/1993 | Jarczynski | H02K 9/19 310/54 |
| 5,473,207 | A | | 12/1995 | Hopeck | |

(Continued)

FOREIGN PATENT DOCUMENTS

| EP | 2463991 A2 | 6/2012 |
|---|---|---|
| JP | 2009240113 A | 10/2009 |

*Primary Examiner* — Tran Nguyen
(74) *Attorney, Agent, or Firm* — Patent Law Office of David G. Beck

(57) ABSTRACT

A method of cooling an electric motor is provided utilizing axial cooling channels that are integral to the stator teeth, thus allowing direct contact between the circulating coolant and the lamination stack and providing an efficient means of removing motor assembly heat. Additionally, as the coolant flows out of the cooling channels it impinges on the end windings, thereby providing a secondary means of cooling the motor assembly.

6 Claims, 17 Drawing Sheets

(56) References Cited

U.S. PATENT DOCUMENTS

| | | | |
|---|---|---|---|
| 5,678,760 | A | 10/1997 | Muso |
| 5,859,482 | A | 1/1999 | Crowell et al. |
| 6,300,693 | B1 | 10/2001 | Poag |
| 6,323,613 | B1 | 11/2001 | Hara |
| 6,954,010 | B2 | 10/2005 | Rippel et al. |
| 7,009,317 | B2 | 3/2006 | Cronin et al. |
| 7,397,154 | B2 | 7/2008 | Tilton et al. |
| 7,633,194 | B2 | 12/2009 | Dawsey et al. |
| 7,851,966 | B2 | 12/2010 | Rippel |
| 2012/0274159 | A1* | 11/2012 | Le Besnerais ........... H02K 9/19 310/54 |
| 2012/0286597 | A1 | 11/2012 | Gundtoft |
| 2015/0222151 | A1 | 8/2015 | Semken |

* cited by examiner

MOTOR COOLING SYSTEM UTILIZING AXIAL COOLING CHANNELS

CROSS-REFERENCE TO RELATED APPLICATION

This application is a continuation-in-part of U.S. patent application Ser. No. 15/238,807, filed 17 Aug. 2016, the disclosure of which is incorporated herein by reference for any and all purposes.

FIELD OF THE INVENTION

The present invention relates generally to the electric motor assembly of an electric vehicle and, more particularly, to an efficient motor cooling system that can be used to cool the critical elements of a motor assembly.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drive train of a hybrid vehicle is typically more complex than that of either a conventional ICE-based vehicle or an all-electric vehicle, resulting in increased cost and weight. Accordingly, several vehicle manufacturers are designing vehicles that only utilize an electric motor, or multiple electric motors, thereby eliminating one source of pollution while significantly reducing drive train complexity.

In order to achieve the desired levels of performance and reliability in an electric vehicle, it is critical that the temperature of the traction motor remains within its specified operating range regardless of ambient conditions or how hard the vehicle is being driven. A variety of approaches have been used to try and adequately cool the motor in an electric car. For example, U.S. Pat. No. 6,954,010 discloses a device such as a motor, transformer or inductor that utilizes a stack of laminations, where a plurality of at least partially coincident apertures pass through the stack of laminations and define a plurality of coolant passageways. Manifold members located at opposite ends of the lamination stack are used to couple the coolant passageways to a suitable coolant pump and heat sink. A variety of aperture designs are disclosed, including both same-sized apertures that form straight passageways, and apertures that vary in size, shape and/or position to form non-axial passageways.

U.S. Pat. No. 7,633,194 discloses a system for cooling the stator lamination stack of an electric motor. The outer periphery of each of the laminations is defined by an array of outwardly projecting pins. A cooling jacket surrounds the stack. The outwardly projecting pins cooperate with the jacket to form a cooling space through which coolant flows.

U.S. Pat. No. 7,009,317 discloses a motor cooling system that utilizes a cooling jacket. The inner surface of the cooling jacket, which may form an interference fit with the stator, includes a series of grooves. The grooves along with the outer surface of the stator form a cooling duct through which coolant is pumped.

While there are a variety of techniques that may be used to cool an electric vehicle's motor, these techniques typically only provide limited heat withdrawal. Accordingly, what is needed is an effective cooling system that may be used with the high power density, compact electric motors that are commonly used in high performance electric vehicles. The present invention provides such a cooling system.

SUMMARY OF THE INVENTION

The present invention provides a method of cooling an electric motor where the stator of the electric motor is divided into a first stator portion and a second stator portion, where a coolant manifold assembly is integrated into the stator between the first and second stator portions, and where the coolant manifold assembly is divided into a first coolant manifold and a second coolant manifold. The method includes the step of circulating a coolant, for example at a mass flow rate of between 10 and 20 liters per minute, through the coolant manifold assembly via a plurality of manifold ports, where a first portion of the coolant flows in a serpentine pattern between a first plurality of apertures corresponding to the first coolant manifold and a second plurality of apertures corresponding to the second coolant manifold, where a second portion of the coolant flows through a first plurality of coolant passageways corresponding to the first coolant manifold and fluidly coupled to the first plurality of apertures and through a second plurality of coolant passageways corresponding to the second coolant manifold and fluidly coupled to the second plurality of apertures, where the second portion of the coolant flows through the first and second pluralities of coolant passageways and through a plurality of axial cooling channels integrated into a plurality of stator teeth, and where the axis corresponding to each of the axial cooling channels is parallel with a cylindrical axis corresponding to the stator. The axial cooling channels may be formed during stator fabrication such that each axial cooling channel has a rectangularly-shaped cross-section, and more preferably a rectangularly-shaped cross-section with rounded corners.

In one aspect, the method may further include (i) fabricating the first coolant manifold in accordance with a preselected manifold configuration; (ii) fabricating the second coolant manifold in accordance with the preselected manifold configuration; and (iii) assembling the first and second coolant manifolds to form the coolant manifold assembly, the assembling step further comprising (a) reversing the second coolant manifold relative to the first coolant manifold, and (b) aligning the first plurality of coolant passageways with the second plurality of coolant passageways, whereby the first plurality of apertures are offset from the second plurality of apertures due to the aligning step.

In another aspect, the method may further include the coolant manifold fabrication steps of stamping the first and second coolant manifolds, with the manifolds preferably stamped from steel, and more preferably stamped from steel coated with a layer of an electrically insulating material. Preferably during the stamping process the first plurality of apertures and the first plurality of coolant passageways are formed in the first coolant manifold, and the second plurality of apertures and the second plurality of coolant passageways are formed in the second coolant manifold.

In another aspect, the method may further include welding the first stator portion, the second stator portion, and the coolant manifold assembly together to form a single stator assembly.

In another aspect, the circulating step may include the steps of (i) flowing a first amount of the second portion of coolant through a first end portion of each of the plurality of axial cooling channels and directly over a first plurality of end windings; and (ii) flowing a second amount of the second portion of coolant through a second end portion of each of the plurality of axial cooling channels and directly over a second plurality of end windings.

In another aspect, the circulating step may include the step of circulating the coolant through a heat exchanger.

In another aspect, the method may further comprise forming the plurality of axial cooling channels within the plurality of stator teeth during stator fabrication such that a first radial distance measured from the cylindrical axis to an outermost edge of each of the plurality of axial cooling channels is less than a second radial distance measured from the cylindrical axis to an outermost edge of each of the plurality of stator slots. Preferably the plurality of axial cooling channels is formed such that the first radial distance is less than half of the second radial distance.

In another aspect, the method may further comprise forming a second plurality of axial cooling channels within a yoke of the stator during stator fabrication, where during the circulating step a first amount of the second portion of the coolant flows through the plurality of axial cooling channels and a second amount of the second portion of the coolant flows through the second plurality of axial cooling channels. When the second plurality of axial cooling channels is formed, a portion of each of the second plurality of axial cooling channels may extend out of the yoke and into a corresponding stator tooth.

In another aspect, the method may further comprise forming the plurality of axial cooling channels within the plurality of stator teeth during stator fabrication such that a single axial cooling channel is integrated into each stator tooth. Alternately, the plurality of axial cooling channels may be formed such that a pair of axial cooling channels is integrated into each stator tooth, where a first axial cooling channel of the pair of axial cooling channels is integrated completely within a corresponding stator tooth and a second axial cooling channel of the pair of axial cooling channels is partially, or completely, integrated within a yoke of the stator.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

Figure 1:
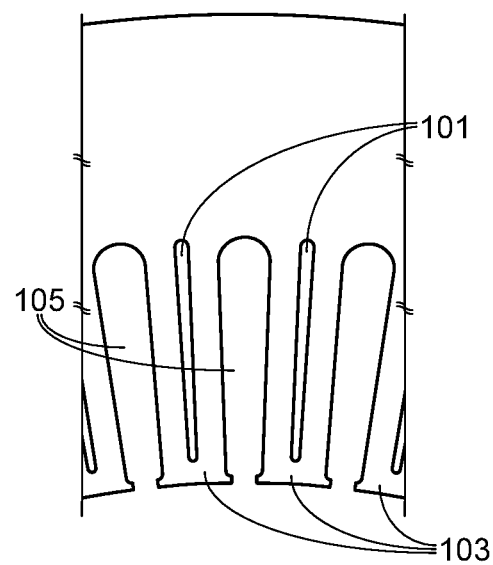
FIG. 1 illustrates a portion of a stator lamination, this view showing the position of the axial cooling channels of the invention within the stator.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

The motor and cooling systems described and illustrated herein are generally designed for use in a vehicle using an electric motor, e.g., an electric vehicle (EV), and may be used with a single speed transmission, a dual-speed transmission, or a multi-speed transmission. In the following text, the terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Electric motors typically generate heat both in the laminations due to iron core losses and in bulky conductors due to eddy currents. The majority of the losses, however, are generated in the stator windings due to resistive copper losses. One common approach to removing heat from the stator is through the use of a coolant jacket, for example a water jacket, which is positioned around the stator laminations. Unfortunately this approach permits hot spots to develop as it does not effectively cool the stator end-windings since the jacket is not placed in close enough proximity to the main source of heat, i.e., the stator windings.

One technique that has been proven effective in mitigating the issue of heat generation in the end-parts of the motor is to splash coolant, e.g., oil, on the stator end-windings and rotor end-rings. By combining this technique with a coolant jacket such as that described above, significant temperature drops can be achieved in an operating electric motor. Unfortunately even this combination of cooling systems will still allow hot spots to develop in the middle of the axial direction of the motor where neither the coolant jacket nor the coolant splashed on the motor end-parts are close enough to effectively remove heat from these regions. Additionally, by combining two separate cooling subsystems, e.g., an outer water jacket and an oil system that includes a pump, overall system complexity is dramatically increased, leading to increased manufacturing cost and reduced reliability.

Figure 2:
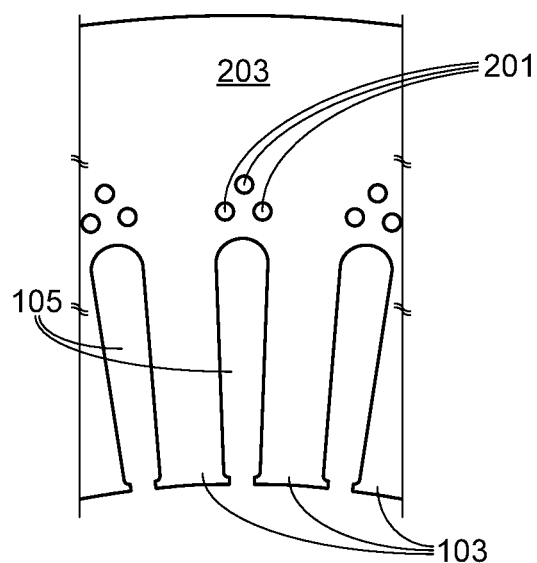
FIG. 2 illustrates a portion of a stator lamination, this view showing circularly-shaped cooling channels positioned in the yoke of the stator.
Figure 3:
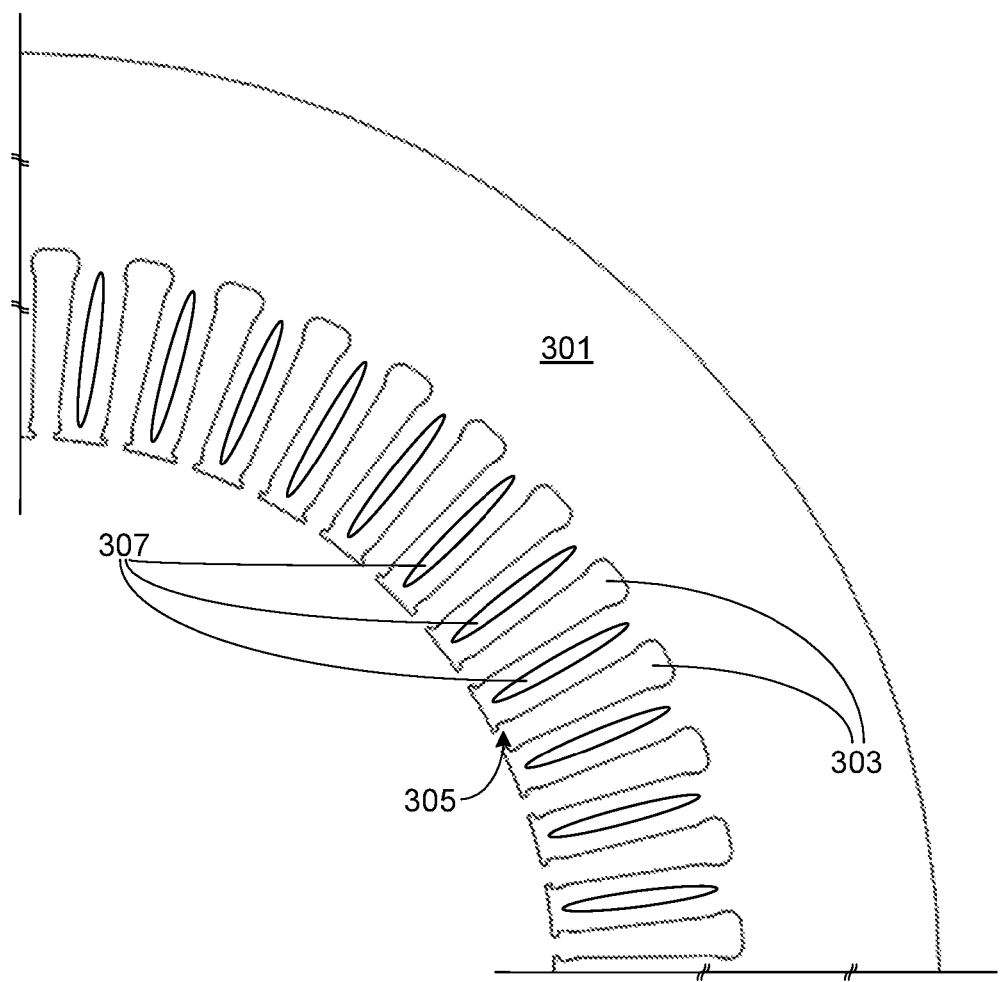
FIG. 3 illustrates a portion of a stator lamination, this view showing elliptically-shaped axial cooling channels.
Figure 4:
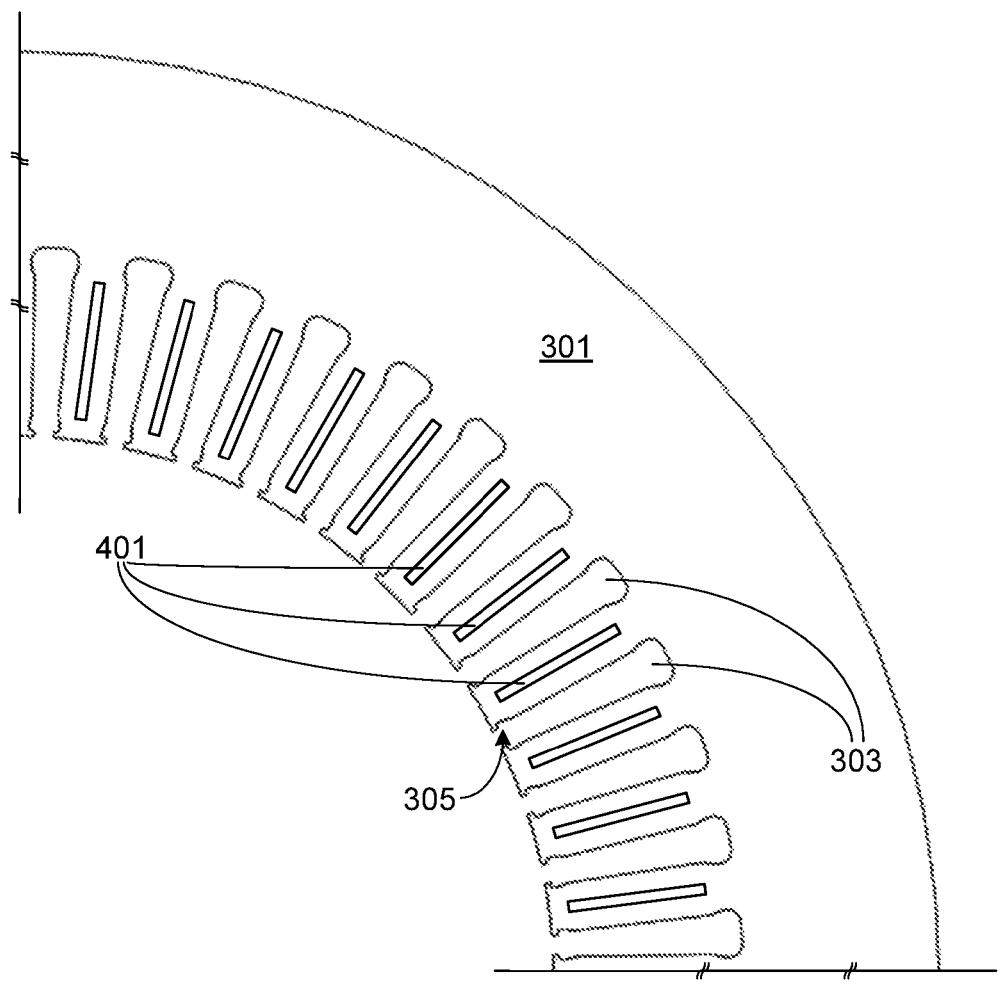
FIG. 4 illustrates a portion of a stator lamination, this view showing rectangularly-shaped axial cooling channels.
Figure 5:
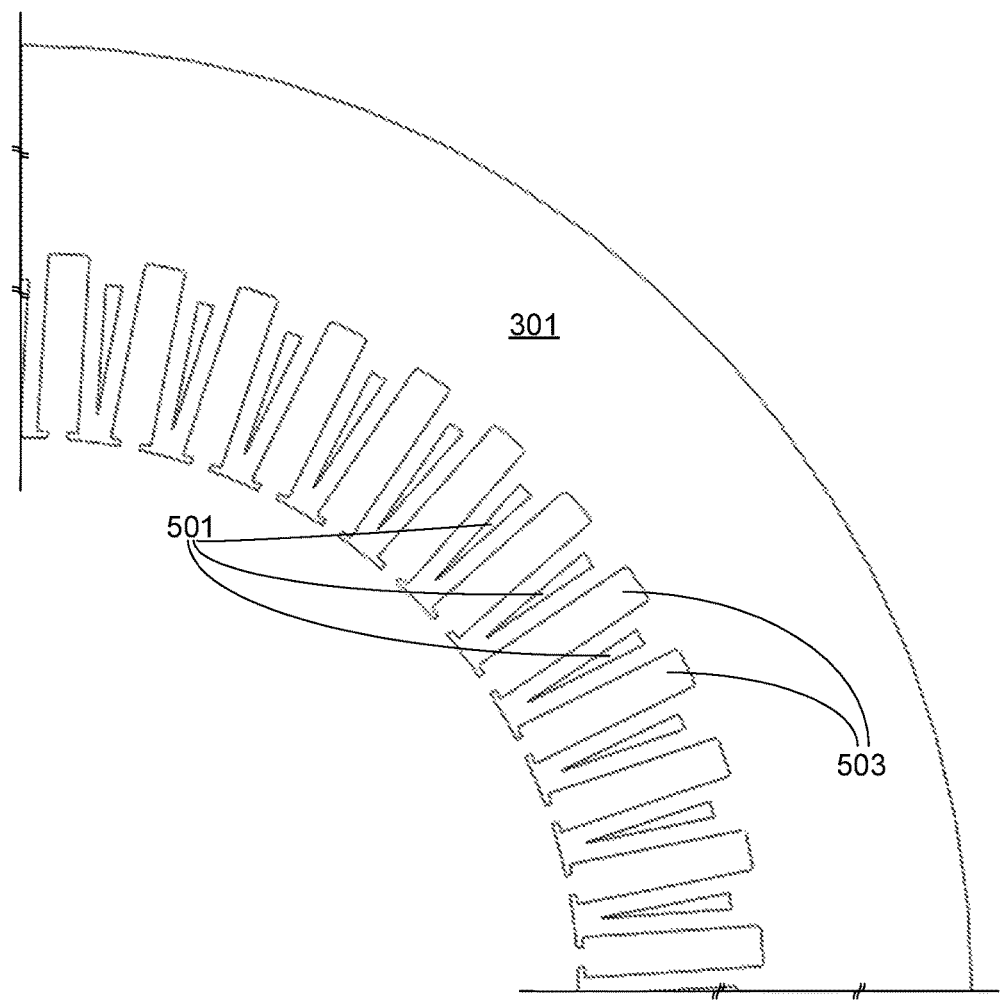
FIG. 5 illustrates a portion of a stator lamination, this view showing triangularly-shaped axial cooling channels.

In order to overcome the limitations of the prior heat extraction approaches, the present invention utilizes thin, long, axial cooling channels 101 which, as shown in the exemplary embodiment of FIG. 1, are located in the stator teeth 103, in between and near slots 105. Since the main heat source in the stator is the winding, locating cooling channels 101 in the teeth provides a very efficient means for removing heat from the motor assembly. For example, in one case study the inventors compared the motor cooling capabilities of three different heat extraction systems: (i) axial cooling channels in accordance with the invention (see, for example, FIG. 1), with a cumulative coolant oil mass flow rate through the axial cooling channels in the range of 10-20 liters per minute (LPM), and where a single cooling channel is located within each stator tooth and the motor does not include a water cooling jacket; (ii) circularly-shaped cooling channels 201 located within the stator yoke 203 (see FIG. 2), with a cumulative coolant oil mass flow rate through the circularly-shaped cooling channels in the range of 10-20 LPM and with three circularly-shaped cooling channels per stator slot and where the motor does not include a water cooling jacket; and (iii) a water cooling jacket surrounding the stator in accordance with the prior art. In this case study the motor losses were approximately 3100 W. For this example, the axial cooling channels of the invention lowered the peak operating temperature within the lamination stack by approximately 40° C. more than the cooling jacket configuration, and by approximately 23° C. more than the circularly-shaped cooling channel configuration. The axial cooling channels of the invention achieved a similar cooling improvement relative to the copper windings. It will be appreciated that by reducing the peak temperature, the stator resistance drops, leading to decreased stator copper losses. As a result, the amount of copper used in the windings can be reduced, leading to cost savings, without compromising overall motor performance.

In general, the size and localization of the axial cooling channels are optimized, for example using a multi-physics simulation, from electromagnetic, thermal and structural points of view for the particular application (e.g., EV traction motor), motor (e.g., size, output, duty cycle, etc.) and cooling system (e.g., coolant characteristics, heat exchanger characteristics, etc.) in question. The manufacturability of the cooling channels is also taken into account, for example insuring that the dimensions and shape of the cooling channel lends itself to the use of a suitable manufacturing tool (e.g., a tool with a radius of 0.5 mm or larger for a conventional tool). It will be appreciated that the axial cooling channels of the invention can utilize any of a variety of shapes. Preferably every tooth of the stator includes an axial cooling channel such as one of those disclosed herein, thus preventing hot spots that can develop if the cooling channels are only incorporated into a subset of the stator teeth. Additionally, including axial cooling channels within every stator tooth, as opposed to a subset of teeth, simplifies the winding insertion process.

Figure 6:
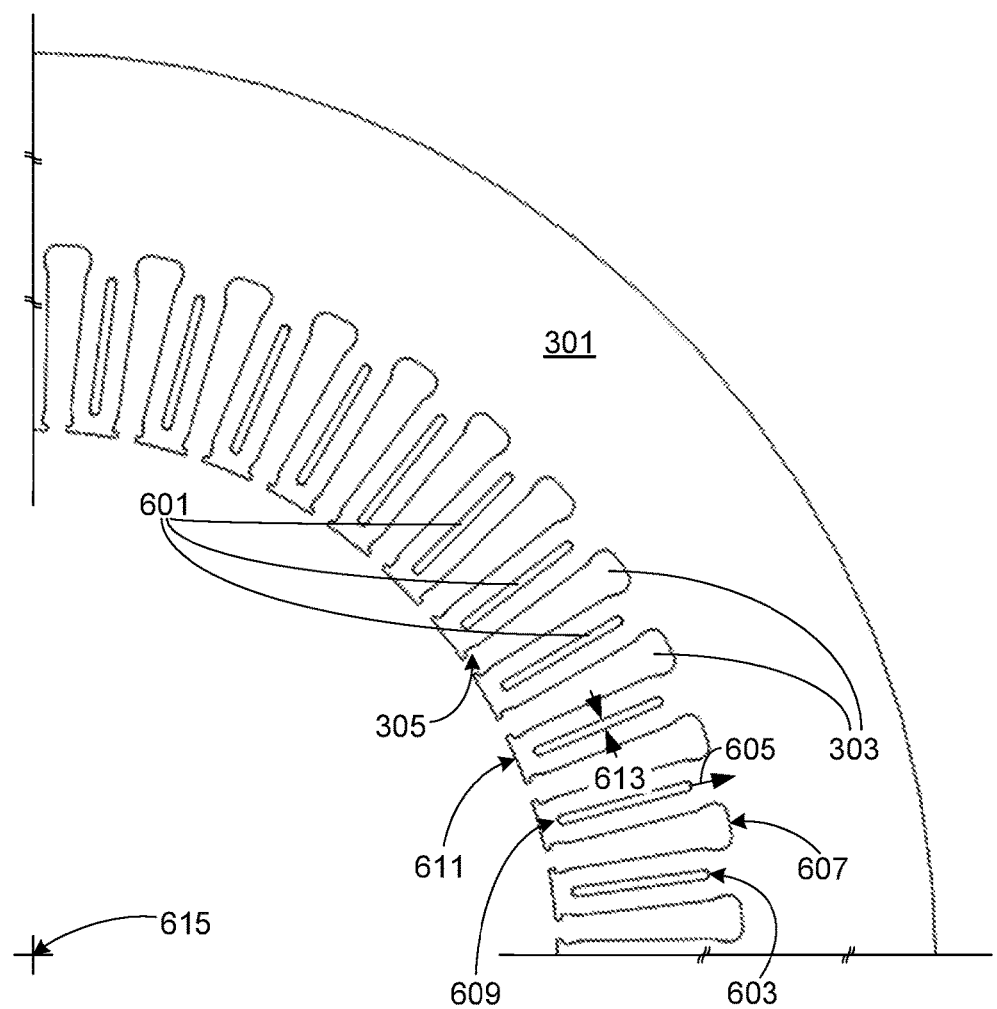
FIG. 6 illustrates a portion of a stator lamination, this view showing rectangularly-shaped axial cooling channels with rounded corners.
Figure 7:
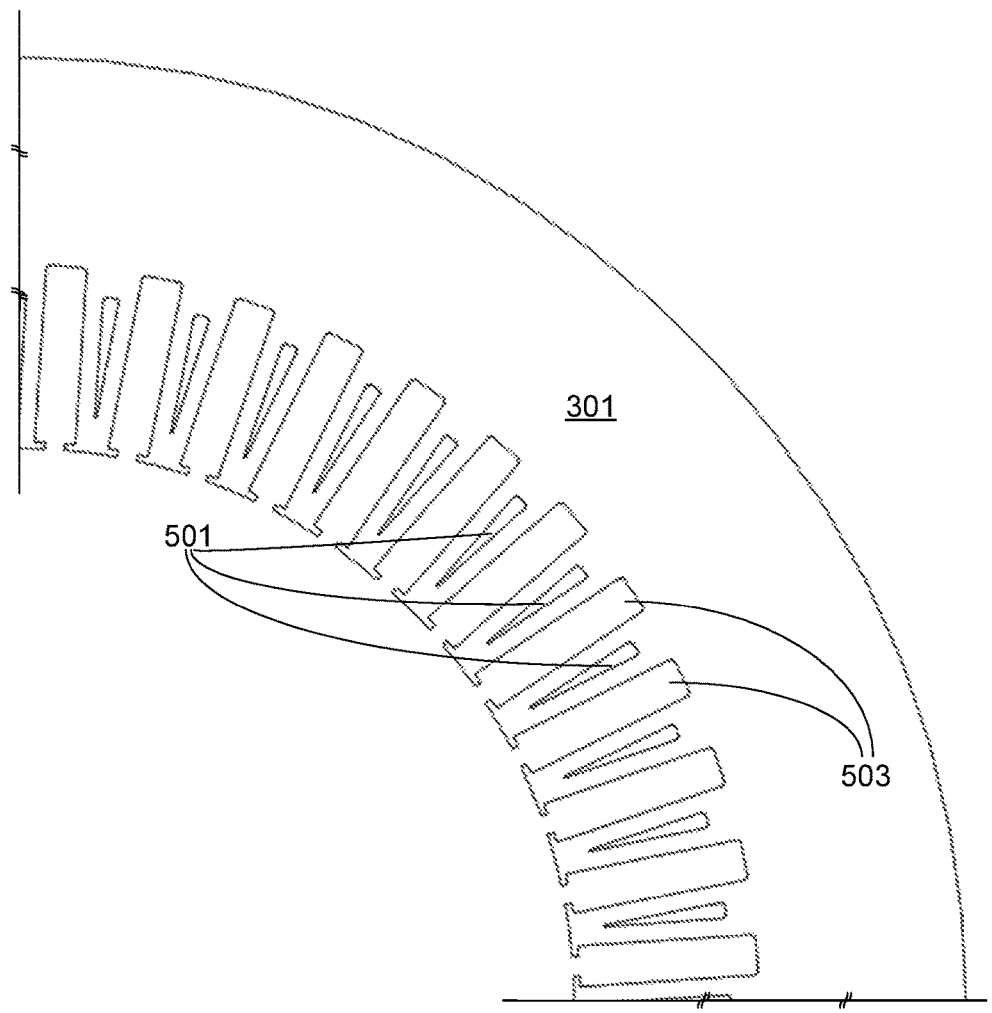
FIG. 7 illustrates a portion of a stator lamination, this view showing triangularly-shaped axial cooling channels with rounded corners.

FIGS. 3-7 illustrate common cooling channels shapes in accordance with the invention, each of these exemplary configurations shown in a portion of a stator 301. In these figures slots 303 have been optimized to allow for a higher slot fill. Additionally the bottom portion 305 of each channel has been shaped to simplify the inclusion of a slot wedge (not shown) which, as is well known by those of skill in the art, is used to hold the windings in place within the slots. It should be understood, however, that the invention is not limited to a specific channel shape or a specific slot shape. For example, the axial cooling channels may be generally elliptical in shape (e.g., channels 307 shown in FIG. 3), generally rectangular in shape (e.g., channels 401 shown in FIG. 4), or generally triangular in shape (e.g., channels 501 shown in FIG. 5). Furthermore, the corners of the rectangular and triangular cooling channels may be rounded or not, and if rounded the radius of curvature for the rounded corners may be optimized. FIG. 6 illustrates rectangularly-shaped axial cooling channels 601 with rounded corners and FIG. 7 illustrates triangularly-shaped axial cooling channels 701 with rounded corners. It will be appreciated that the triangularly-shaped axial cooling channels shown in FIGS. 5 and 7 may allow the slot shape to be rectangular as shown (i.e., slots 503) and therefore are particularly suitable for a hairpin winding type with rectangular shapes. Regardless of the cooling channel shape, preferably the outermost edge 603 of each cooling channel does not extend outwardly (in a direction 605 measured from the cylindrical axis 615 of the stator) beyond the edge 607 of the adjacent stator slot 303 (see FIG. 6). The innermost edge 609 of each cooling channel is positioned at a sufficient distance from inner tooth edge 611 to insure the structural integrity of the tooth and in order to maintain a sufficiently low magnetic saturation. Although other channel widths may be used, in the preferred embodiment the width 613 of each cooling channel is on the order of 1 millimeter.

An electric motor heats up with the increase of the mechanical loading that gives rise to the electrical current in the stator windings. The resistive loss, $P_W$, in a stator winding can be approximated by:

$$P_W = (I_{ph}^2)(R_{dc}),$$

where $I_{ph}$ is the phase current and $R_{dc}$, is the DC current. $R_{dc}$, is dependent on the cross section and length of the wire used in the windings as well as the resistivity, $\rho$. The resistivity, $\rho$, is dependent upon the temperature, T. If the temperature, T, does not vary too much, a linear approximation such as that shown below may be used to determine resistivity. Specifically:

$$\rho(T) = \rho_0[1 + \alpha(T - T_0)],$$

where $\alpha$ is the temperature coefficient of resistivity, $T_0$ is a fixed reference temperature (usually room temperature), and $\rho_0$ is the resistivity at temperature $T_0$. The parameter $\alpha$ is an empirical parameter fitted from measurement data. In copper, $\alpha$ is 0.003862 $K^{-1}$.

The steel laminations comprising the stator assembly generate magnetic core losses that are dependent on the material properties as well as the flux density and the frequency of the power inverter supply. These losses, along with other motor mechanical and electrical losses, add heat to the system, leading to the rise in temperature in an operating motor.

Preferably the saturation of magnetic flux in the teeth remains at an optimal level so that the electromagnetic torque of the motor is maximized. This goal can be achieved by optimizing slots 105 and the axial cooling channels 101 together. The inventors have found that this optimization typically results in a reduction in slot width, leading to decreased copper and increased stator resistance. As shown below, the incremental increase in stator resistance can be overcome by the drop in temperature, which allows for a drop in the resistance.

From a thermal point of view, the axial cooling channels are optimized to minimize the thermal resistance between the coolant-wetted areas of the cooling channels and the coolant inlet section of each channel. For a given amount of heat to be dissipated, a lower thermal resistance results in lower temperatures within the motor. The thermal resistance, $R_{th}$, is related to the wetted area, A, and the heat transfer coefficient, $\alpha_{ht}$, through the following equation:

$$R_{th} = 1/(A \cdot \alpha_{ht}).$$

The heat, Q, extracted by a single channel can be expressed as:

$$Q = (T_{wall} - T_{inlet})/R_{th},$$

where $T_{wall}$ and $T_{inlet}$ represent the average temperature on the coolant-wetted area of the channel and the average coolant temperature at the inlet section of the cooling channel, respectively. This equation can be rewritten as:

$$Q = A \cdot \alpha_{ht} \cdot (T_{wall} - T_{inlet}).$$

Therefore the key to lowering the temperature inside the motor is to maximize the quantity $A \cdot \alpha_{ht}$, thereby minimizing the thermal resistance. The value of the heat transfer coefficient, $\alpha_{ht}$, is dependent on the heat transfer mechanisms occurring within the coolant, i.e., conduction and convection. Conduction results from the thermal properties of the coolant, specifically the thermal conductivity of the coolant. Given that the coolant flowing through the axial cooling channels is in direct contact with the lamination stack and the copper end-windings, preferably the coolant is neither electrically conductive nor is it corrosive. In at least one embodiment of the invention, motor or transmission oil with a high dielectric strength is used as the coolant.

The convective mechanism of heat extraction depends on the fluid motion regime within the axial cooling channels. Fluid motion within the channels is dependent on the Reynolds number, Re, which represents the ratio between the inertial and viscous forces associated with the flowing coolant and is given by:

$$Re = (\rho \cdot v \cdot D)/\mu,$$

where $\rho$ is the coolant density, $v$ is the average coolant velocity measured on the transverse cross section of the channel, D is the hydraulic diameter and $\mu$ is the coolant dynamic viscosity. For low Reynolds numbers, typically less than 2300, the coolant regime is laminar and the main heat transfer mechanism is conduction. For high Reynolds numbers, typically greater than 4000, the coolant regime is turbulent. In this case the fluctuations occurring within the coolant increase mixing, resulting in additional heat transfer mechanism via convection. The coolant regime is in transition for Reynolds numbers that are greater than 2300 and lower than 4000.

The hydraulic diameter, D, is defined as:

$$D = 4(A_{sec}/P_{sec}),$$

where $A_{sec}$ is the cross-section area and $P_{sec}$ is the wetted perimeter of the cooling channel cross-section. As previously noted, in order to lower motor temperature the quantity $A \cdot \alpha_{ht}$ should be maximized, preferably by maximizing both the coolant-wetted area, A, and the heat transfer coefficient, $\alpha_{ht}$, which depends on the fluid regime. Expressions for the heat transfer coefficient can be conveniently written in terms of the Nusselt number, Nu, the Prandt number, Pr, and the ratio between the channel length, L, and hydraulic diameter, D. Typically they take the general non-dimensional form of:

$$Nu = F(Pr, Re, L/D \ldots).$$

The Nusselt and Prandt numbers are defined as:

$$Nu = \alpha_{ht} \cdot (D/k), \text{ and}$$

$$Pr = Cp \cdot (\mu/k),$$

where Cp is the specific heat of the cooling fluid, k is the thermal conductivity of the cooling fluid, and μ is the dynamic viscosity of the cooling fluid.

It is therefore clear from the above that there are numerous factors that impact the specific design of the axial cooling channels as applied to a specific motor; these factors include the coolant-wetted area, A, the heat transfer coefficient, $\alpha_{ht}$, the topology and dimension of the channels, and the mass flow rate. Accordingly, an optimization study was performed in order to optimize the design of the axial cooling channels from electromagnetic, thermal and structural points of view. This study showed that the axial cooling channels of the invention, located within the stator teeth as described above, provide significant electromagnetic, thermal and mechanical advantages over axial cooling channels located in the yoke of the stator. For example, the axial cooling channels positioned within the stator teeth do not generate additional higher harmonics for the magnetic flux in the stator due to their unique placement in the teeth, parallel to the stator slots where the flux is unidirectional. As a result, the thin, long axial cooling channels located in the stator teeth act in a manner similar to that of the stator slots, directing the flux into the air-gap and the rotor. In contrast, locating an axial channel in the stator yoke, including the 'root' of the stator teeth, where the flux is non-unidirectional can disturb the flux and generate higher harmonics that create additional losses.

Figure 8:
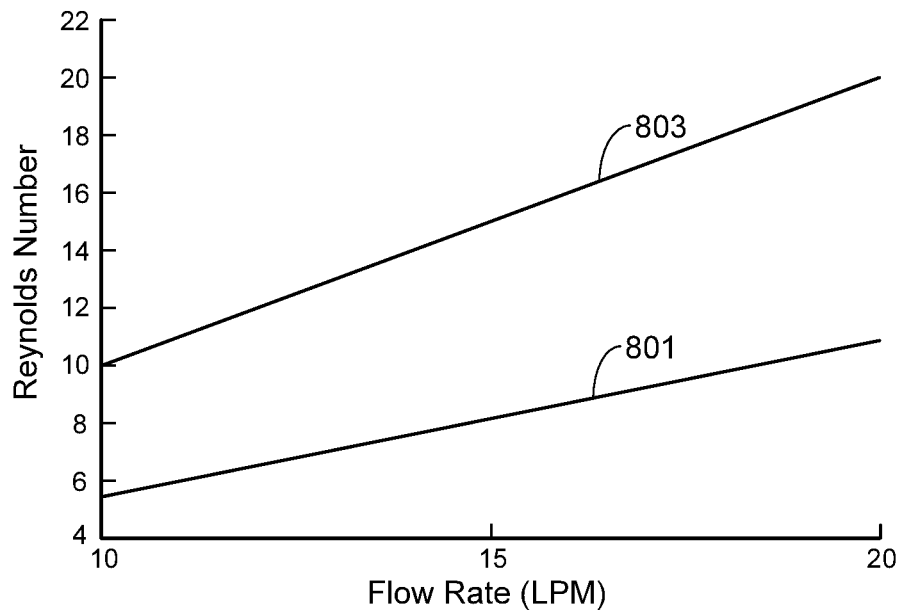
FIG. 8 graphically compares the Reynolds number versus flow rate for two types of axial cooling channels.

Additionally, the optimization study determined that the best multi-disciplinary trade-off between electromagnetic performance and thermal performance is obtained by employing many small channels, for example an axial cooling channel between each pair of stator slots, instead of fewer channels with larger cross sections. This results in small hydraulic diameters for the channels and therefore, given the properties of the preferred coolant (e.g., transmission oil) and the available range in terms of mass flow rates, in low Reynolds numbers. This implies that the flow regime within the axial cooling channels is always laminar for the mass flow rate values that are plausible for cooling the motor with transmission oil (e.g., cumulative flow rate through all channels in the range of 10-20 LPM). FIG. 8 graphically illustrates the Reynolds number versus flow rate for two types of axial cooling channels. Curve 801 represents the Reynolds number data for elliptically-shaped cooling channels located within the stator teeth (see FIG. 1) while curve 803 represents the Reynolds number data for circularly-shaped channels located within the yoke of the stator (see FIG. 2).

It is well known that the laminar fluid regime requires a certain portion of the channel's longitudinal length before it can fully develop its velocity profile. Typically the heat transfer coefficients obtained within this "entrance region" are higher than those obtained once the fluid regime is fully developed. As a result, longer channels usually provide lower average heat transfer coefficients. Moreover, when the cross-section of the channel is not circular, the local heat transfer coefficient varies around the periphery, approaching zero at its corners. Accordingly, in order to optimize the overall energy efficiency of a cooling system, the pressure drop across the cooling channels must be taken into account, as the higher the required pressure drop is, the more energy will have to be supplied to pump the coolant. Typically the cooling channels are designed with a large enough pressure drop to promote uniform coolant flow through all channels. For example, in at least one preferred embodiment the pressure drop through the cooling channels is in the range of 2 to 30 kPa. In addition, the cooling channels are preferably designed to minimize the pressure drop at the entry locations, thus maximizing the efficiency of the coolant pumping circuit. In one exemplary embodiment, the flow rate is adjusted so that the coolant temperature increase through the motor cooling channels is in the 5° to 20° C. range.

From a structural point of view, the stator laminations and the cooling channels must be designed to withstand the torque acting on the stator lamination teeth and, in particular, the tips of the teeth. In this respect, placing the cooling channels in the middle of the transverse section of the stator teeth has been determined to not weaken the structural integrity of the teeth since the location of the axial cooling channels is aligned with the neutral axis of the load bearing section of the teeth. The axial cooling channels with rounded corners are preferred in order to reduce the mechanical stress of the stator laminations (see, for example, FIGS. 6 and 7). From a cooling point of view, since the coolant (e.g., oil) exits the channels and impinges directly on the end-windings, the axial cooling channels of the invention provide the added benefit of improving the cooling of the stator end-windings.

Figure 9:
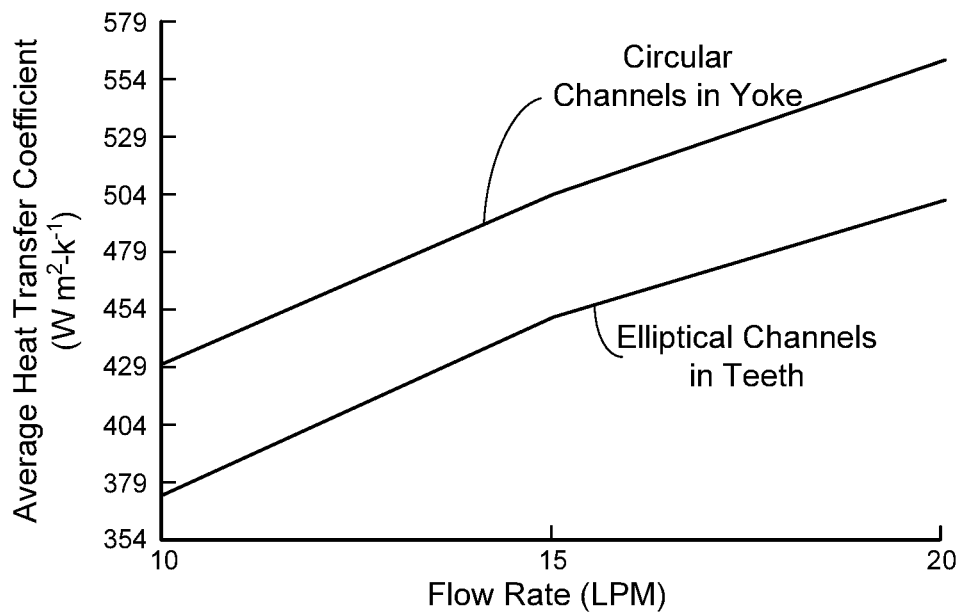
FIG. 9 provides a graphical comparison of the average heat transfer coefficient for circularly-shaped cooling channels positioned in the yoke of the stator and elliptically-shaped cooling channels positioned in the teeth of the stator.
Figure 10:
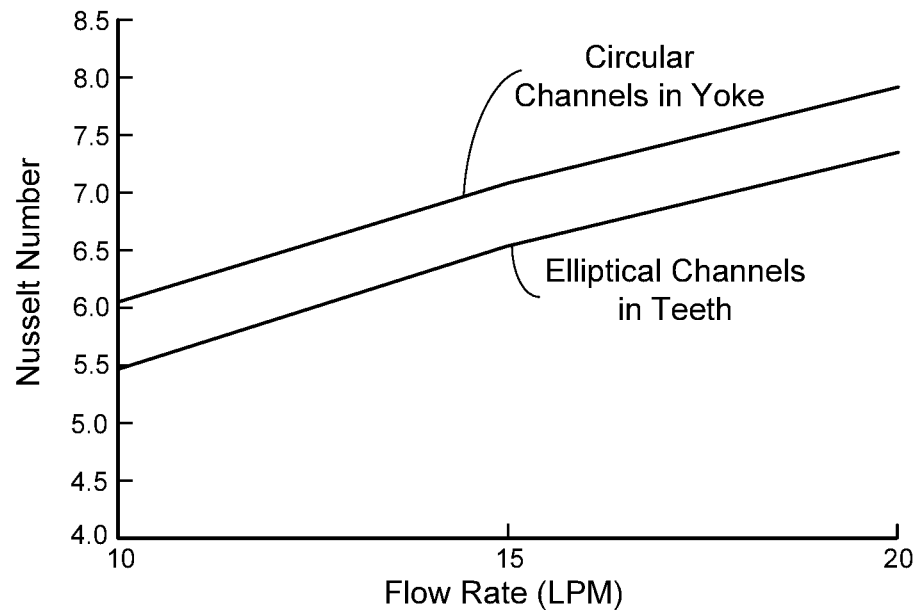
FIG. 10 provides a graphical comparison of the average Nusselt number for circularly-shaped cooling channels positioned in the yoke of the stator and elliptically-shaped cooling channels positioned in the teeth of the stator.
Figure 11:
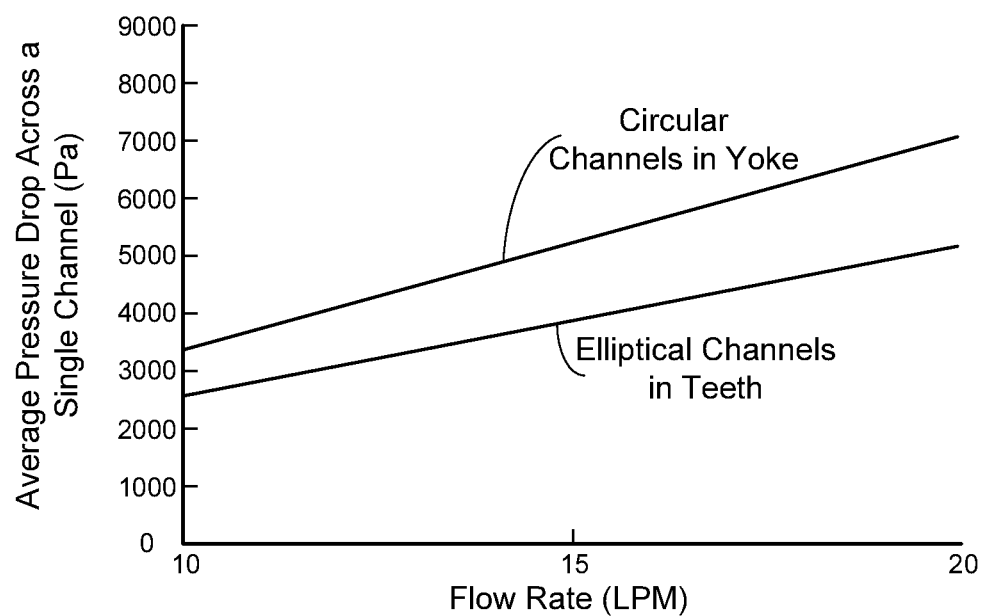
FIG. 11 provides a graphical comparison of the average pressure drop across a single channel for circularly-shaped cooling channels positioned in the yoke of the stator and elliptically-shaped cooling channels positioned in the teeth of the stator.

The optimization studies that were performed to compare the performance of cooling channels with a circular cross-section located in the stator yoke to those with an elliptical cross-section located within the stator teeth have shown that the latter configuration is preferred even though both the average heat transfer coefficient and the average Nusselt number are higher for the former configuration (see FIGS. 9 and 10). The preference for the coolant channels located within the stator teeth is because this configuration is always more effective in extracting heat and lowering the temperature within the motor, particularly within the stator components, including the lamination stack and the copper windings. This result is due to (i) the coolant channels located within the teeth being placed closer to the stator copper bars than the coolant channels located in the yoke and (ii) the lower thermal resistance of the elliptically-shaped channels within the teeth. The lower thermal resistance of the elliptically-shaped channels is the result of the larger available wetted area as compared to that of the circularly-shaped channels located within the yoke. An additional advantage offered by the axial cooling channels positioned between the stator slots is that the pressure drop across each channel, for the same mass flow rate, is less than that of the circularly-shaped channels located within the stator yoke (see FIG. 11). Thus less energy is required to pump the coolant, resulting in a more energy efficient cooling system. From a manufacturing standpoint, the number of channels required for the channels located within the stator teeth is always less than the number of channels required for the circularly-shaped yoke channel configuration, thereby simplifying system manufacturing.

Based on the optimization studies, the preferred embodiment of the invention utilizes axial cooling channels that are positioned within the stator teeth, i.e., between the stator slots. Although not required, preferably a single axial cooling channel is fabricated into each stator tooth (see, for example, FIG. 6). Furthermore, in order to achieve optimal heat removal preferably the coolant (e.g., a non-corrosive, non-electrically conductive oil) is fed into the center of the lamination stack, rather than into one end of the stack. Feeding into the center of the stack allows shorter cooling channels, i.e., left and right portions of the stack rather than extending throughout the entire stack, thus providing higher average heat transfer coefficients and improved cooling.

Additionally, feeding into the stack center allows cooling to start in the middle of the stack where heat is trapped and hot spots typically occur.

Figure 12:
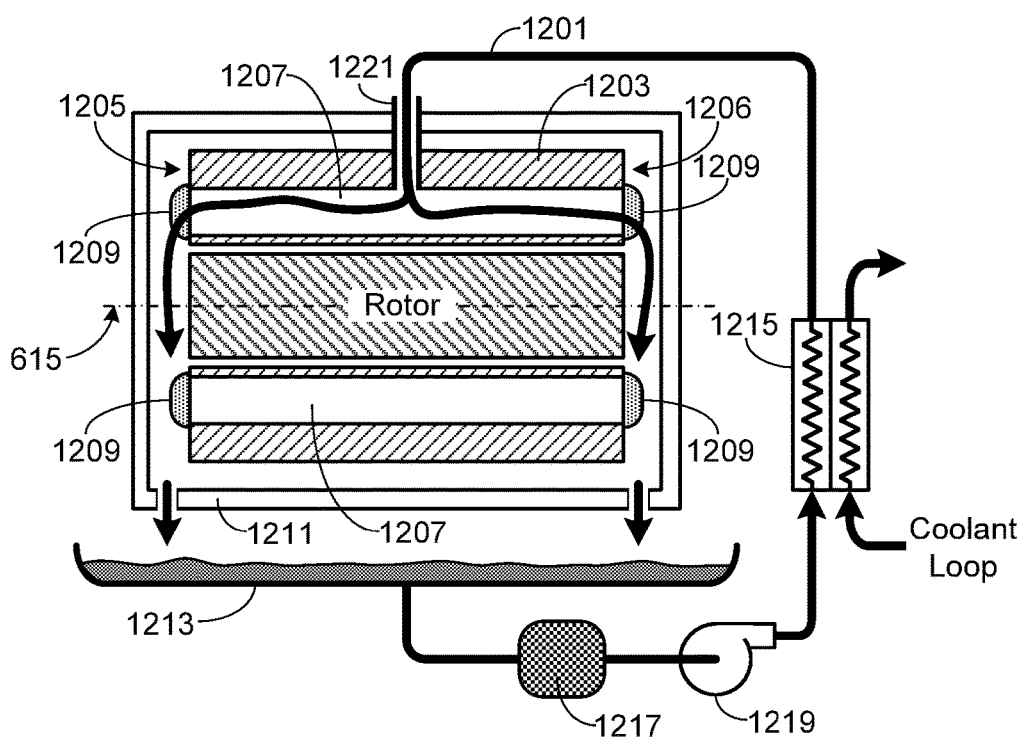
FIG. 12 provides a simplified cross-sectional view of an electric motor utilizing a cooling system as described herein.

FIG. 12 provides a simplified cross-sectional view of an electric motor utilizing a cooling system as described herein. As shown, coolant 1201 is pumped into the center, or approximate center, of the lamination stack comprising the stator 1203. The coolant flows from the center outward towards both ends 1205/1206 of the stator via the axial coolant channels 1207. As the coolant exits the stator, it flows directly over end windings 1209, before passing through the motor case 1211 and being collected in coolant pan 1213. After passing through a heat exchanger 1215, and preferably after passing through a filter 1217, the coolant is pumped back into the stator using pump 1219.

Figure 13:
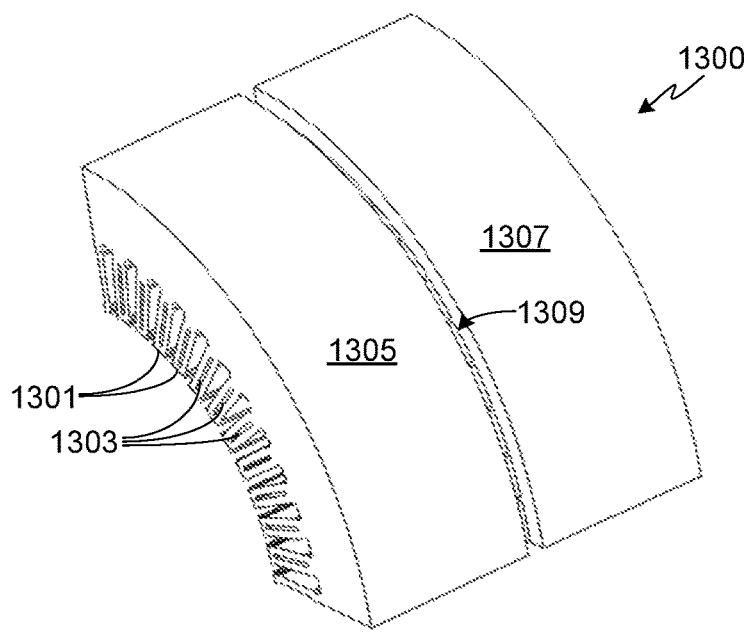
FIG. 13 provides a perspective view of a portion of a lamination stack comprising a stator such as that shown in FIG. 12.

FIG. 13 provides a perspective view of a portion 1300 of a lamination stack, such as the lamination stack comprising stator 1203 of FIG. 12. It will be appreciated that in this simplified view the individual laminates comprising the lamination stack are not individually visible. Additionally the stator windings are not shown in this figure, thus allowing a better view of the individual stator teeth 1301 as well as the cooling channels 1303 incorporated into each tooth. It will be appreciated that the design and manufacture of the stator, with the exception of the axial cooling channels described herein, is well known and therefore a detailed description will not be provided. In general, the stator is comprised of a stack of plates, typically referred to as laminations, where each plate is electrically insulated from the adjacent plate(s). The plates are normally stamped or otherwise fabricated from a single sheet of material (e.g., steel). To achieve electrical isolation, both surfaces of each plate are coated with an electrically insulating layer. The electrically insulating coating may be applied before or after the fabrication of the plate, e.g., before or after stamping. Since each plate includes one or more layers of an electrically insulating material, after coating the plate is generally referred to as a laminate or lamination, and the stack of plates is generally referred to as a lamination stack. After stack assembly, the windings are disposed about the stator teeth.

Figure 14:
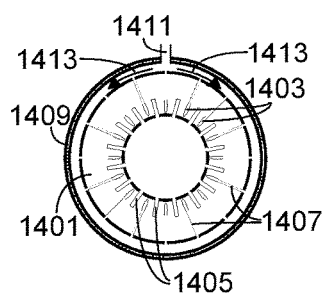
FIG. 14 provides a simplified cross-sectional view of the manifold assembly, this view illustrating distribution of the coolant about the manifold.
Figure 15:
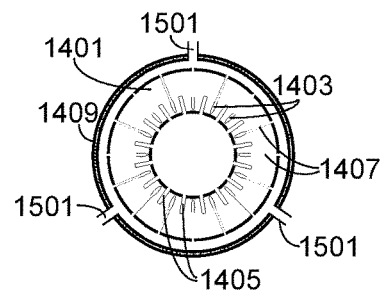
FIG. 15 provides a simplified cross-sectional view of an alternate configuration for distributing the coolant about the manifold.

Incorporated into the stator, and located between the left portion 1305 and the right portion 1307 of the lamination stack, is a coolant manifold 1309. The coolant manifold 1309 is coupled to the coolant intake 1221 shown in FIG. 12. The coolant is pumped through intake 1221 and into manifold 1309, the manifold then distributing the coolant to all of the axial cooling channels 1303. Manifold 1309 is coupled, and sealed, to intake 1221 such that the coolant that is pumped through intake 1221 flows about the entire perimeter of manifold 1309. By sealing the intake to the manifold, the coolant is forced through the manifold into all of the axial cooling channels. This aspect of the invention is illustrated in the simplified cross-sectional views shown in FIGS. 14 and 15. In FIGS. 14 and 15 a manifold 1401 is shown, manifold 1401 including a plurality of axial cooling channels 1403 and a plurality of slots 1405. Each cooling channel 1403 is fluidly coupled to the outer perimeter of the manifold via a coolant passageway 1407. Due to seal 1409, the coolant entering intake 1411 flows about the perimeter of manifold 1401, following flow pathways 1413. The coolant then flows through coolant passageways 1407 and into axial cooling channels 1403. If desired, and as illustrated in FIG. 15, multiple coolant intakes 1501 may be incorporated into the assembly, thus helping to promote distribution of the coolant about the perimeter of manifold 1401. In the view provided in FIG. 15, manifold 1401 is coupled to three coolant intakes 1501, although it will be appreciated that the assembly may use a fewer number or a greater number of intakes.

Figure 16:
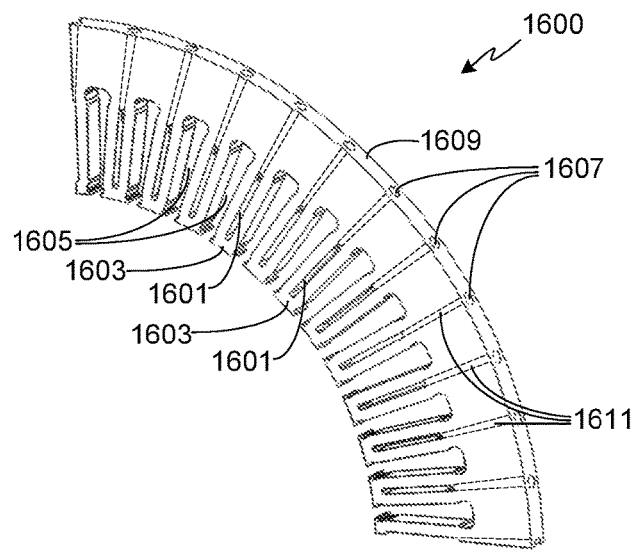
FIG. 16 provides a perspective view of a portion of a preferred embodiment of a coolant distribution manifold.
Figure 17:
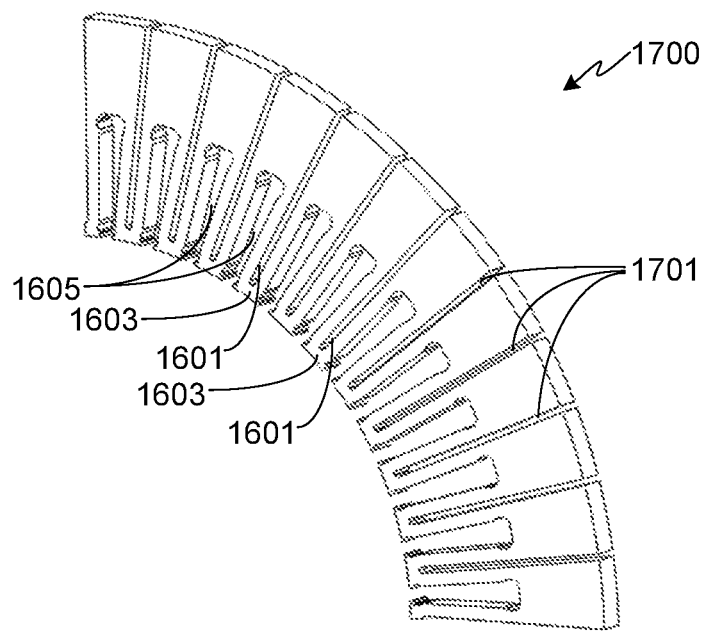
FIG. 17 provides a perspective view of a portion of an alternate preferred embodiment of a coolant distribution manifold.

FIGS. 16 and 17 provide perspective views of portions of two different embodiments of a coolant distribution manifold. A plurality of axial cooling channels 1601 integrated into corresponding stator teeth 1603 as well as a plurality of slots 1605 are visible in both manifold 1600 shown in FIG. 16 and manifold 1700 shown in FIG. 17. In manifold 1600 a plurality of apertures 1607, also referred to herein as ports, located about the perimeter 1609 of the manifold permit coolant to pass into the manifold and through coolant coupling passageways 1611, shown in phantom, to axial cooling channels 1601. In manifold 1700 a plurality of slots 1701 provide the passageways that permit coolant to flow into the axial cooling channels 1601. Manifold 1600 is preferably fabricated using a casting process, although other manufacturing techniques may be used (e.g., stamping). In at least one embodiment the material comprising manifold 1600 is aluminum while in a second, preferred embodiment the material comprising manifold 1600 is a soft magnetic composite material (i.e., an SMC). Manifold 1600 may be fabricated from other materials as well (e.g., steel, plastic). SMCs are preferred as they offer a variety of desirable characteristics including three-dimensional isotropic ferromagnetic behavior, low eddy current loss, and low total core loss at medium and high frequencies. Additionally, SMCs can be designed to provide enhanced thermal characteristics, lower overall assembly weight and simplify manifold manufacturing. Manifold 1700 is preferably fabricated using a stamping process and incorporates front and back layers of an electrically non-conductive coating. Fabricated into manifold 1700 are coolant distribution passageways 1701, where passageways 1701 are preferably fabricated in the form of radial slots that fluidly couple the outer perimeter of the manifold to the cooling channels as shown. It should be understood that other designs, and other manufacturing techniques, may be used for the manifold that is used to distribute the coolant (e.g., oil) to the axial cooling channels that are fabricated into the stator teeth.

Figure 18:
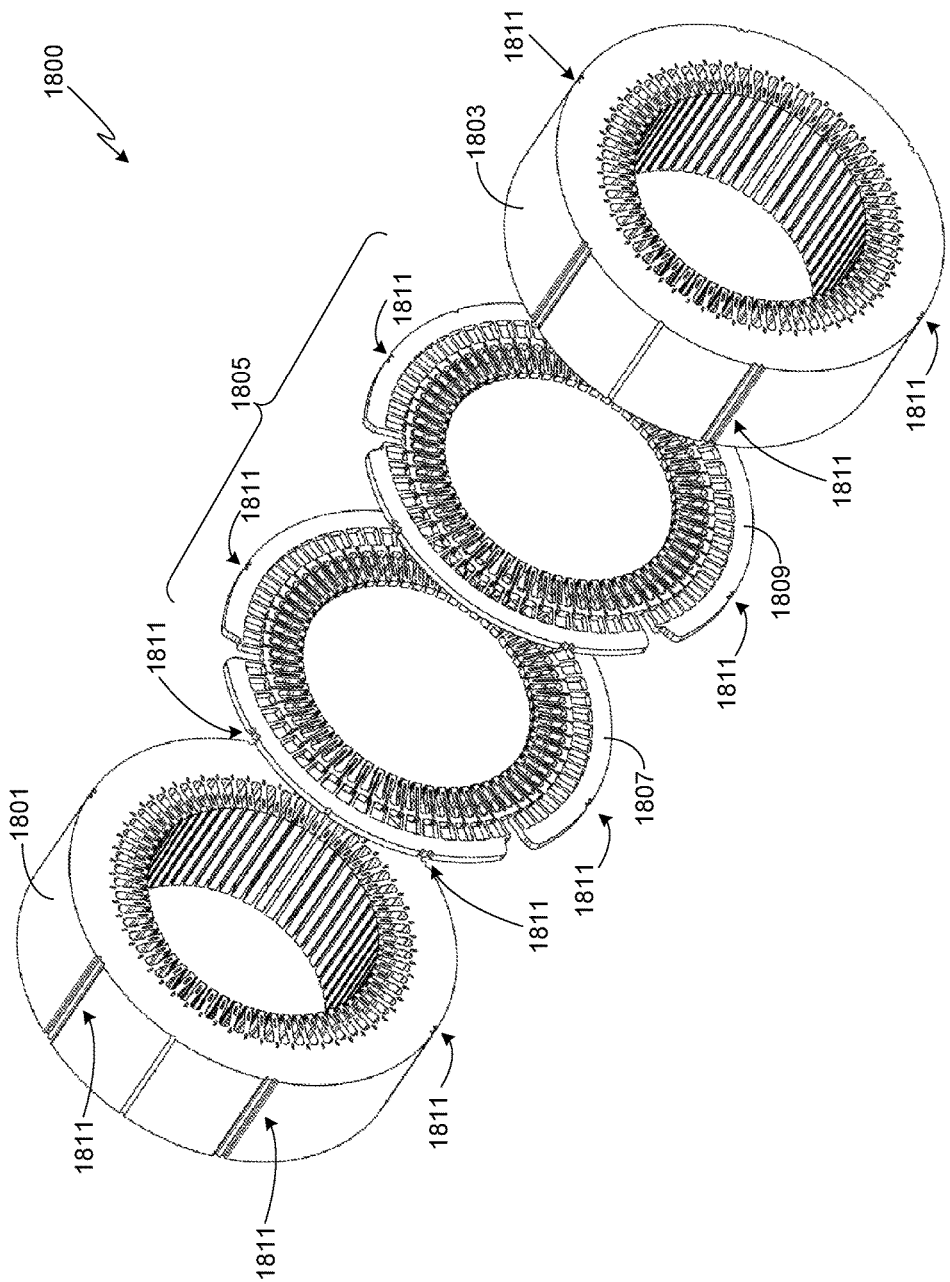
FIG. 18 provides a perspective, exploded view of a stator assembly in accordance with a preferred embodiment of the invention.

FIGS. 18-25 illustrate a preferred design configuration that combines low cost manufacturability with the cooling advantages of the present invention as described above. FIG. 18 provides an exploded view of a stator assembly 1800. As in the prior figures, the stator windings are not shown in FIG. 18 or the subsequent figures in order to provide a clearer view of the stator teeth and the axial cooling channels. In FIG. 18 the first end portion 1801 of the stator stack is separated from the second end portion 1803 of the stack by a coolant manifold assembly 1805. Although not clearly visible in the figures, each portion 1801/1803 of the stator assembly is comprised of a stack of plates, i.e., laminations, with each plate being electrically insulated from the adjacent plate(s). Preferably each lamination comprising portions 1801 and 1803 is stamped or otherwise fabricated from a single sheet of material (e.g., steel). To achieve electrical isolation, both surfaces of each plate are coated with an electrically insulating layer, with the coating being applied either before or after lamination fabrication.

Figure 19:
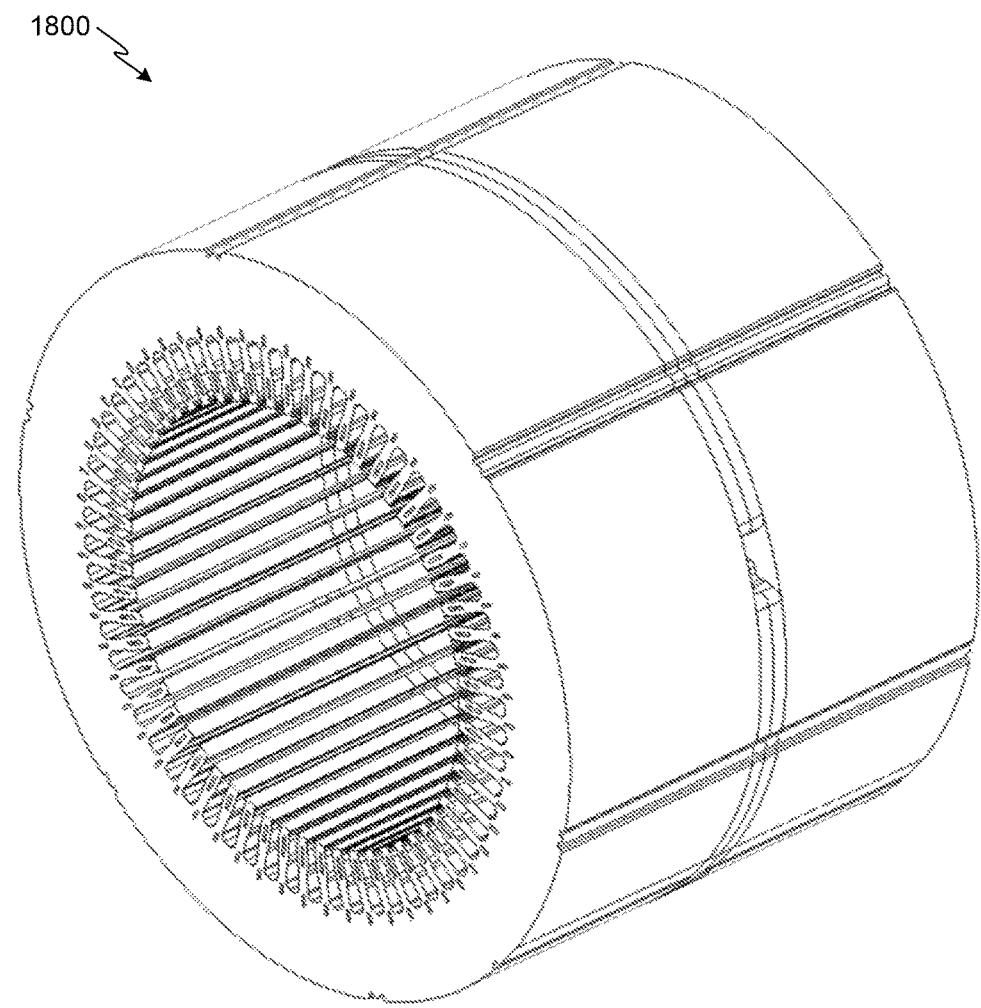
FIG. 19 provides a perspective view of the stator assembly shown in FIG. 18 after assembly.

Coolant manifold assembly 1805 is comprised of a first manifold 1807 and a second manifold 1809. Each manifold 1807 and 1809 may be comprised of a single lamination or of multiple laminations. In this embodiment, the first and second coolant manifolds are each approximately 5 millimeters thick, thus creating an approximately 10 millimeter thick manifold assembly. Preferably the laminations comprising coolant manifolds 1807 and 1809 are fabricated from the same material, e.g., steel, as that used in the laminations comprising stator portions 1801 and 1803. There are several advantages to using the same or similar material for both the coolant manifold laminations and the remaining stator laminations, especially if the selected material is steel. First, the same fabrication process, preferably stamping, can be used to make all of the laminations, thereby lowering manufacturing time and cost. The use of stamping or a similar process to fabricate the manifold assembly avoids the relatively high cost associated with many other manifold fabrication techniques such as drilling, molding, routing, milling, etc. Second, using the same material for all of the laminations lowers overall material cost, a savings which can be significant when considering the fabrication of a large number of motors. Third, a simple process such as welding can be used to form a single, cohesive structure from portions 1801/1803 and coolant manifold assembly 1805 as shown in FIG. 19. In the illustrated structure grooves 1811, which are located about the perimeter of the laminations, are used both for alignment and for welding placement. Fourth, by constructing the manifold assembly from a material with a high thermal conductivity such as steel, heat removal is improved. Fifth, the magnetic characteristics of the manifold assembly will be similar, if not the same, as those associated with the laminations comprising portions 1801 and 1803.

Figure 20:
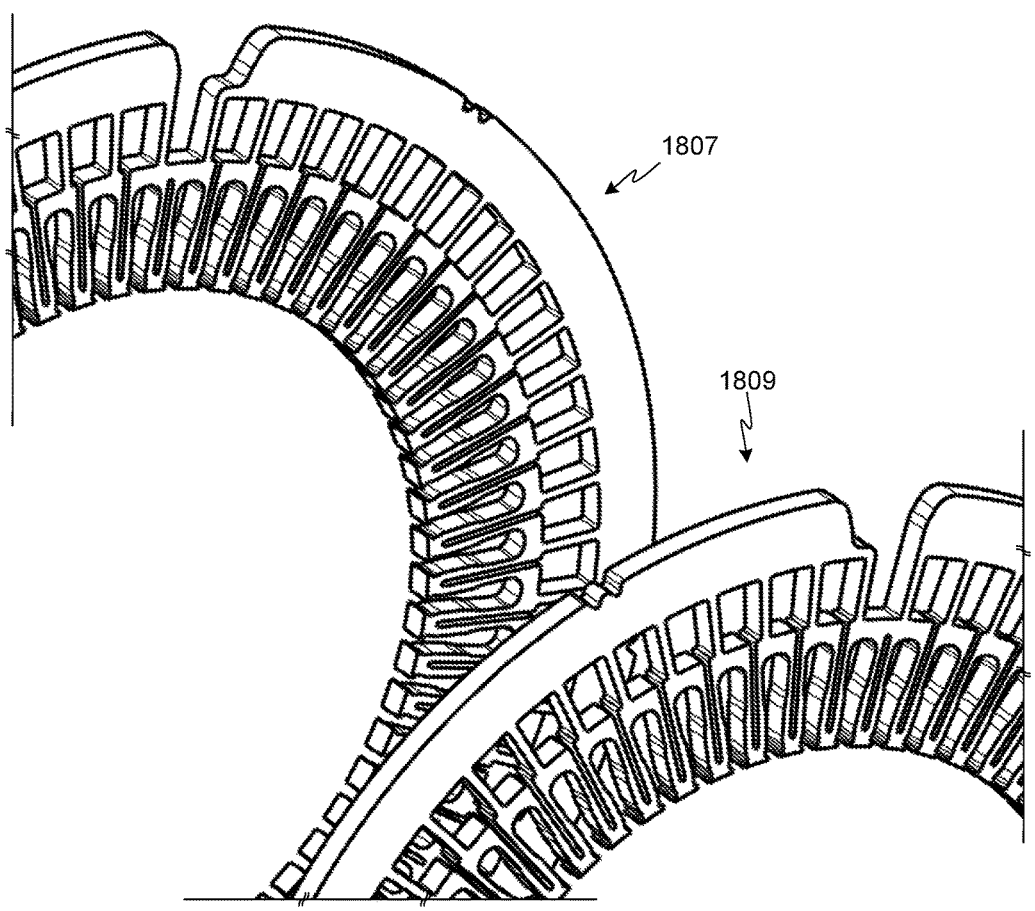
FIG. 20 provides an enlarged, perspective view of portions of the cooling manifolds shown in FIG. 18.
Figure 21:
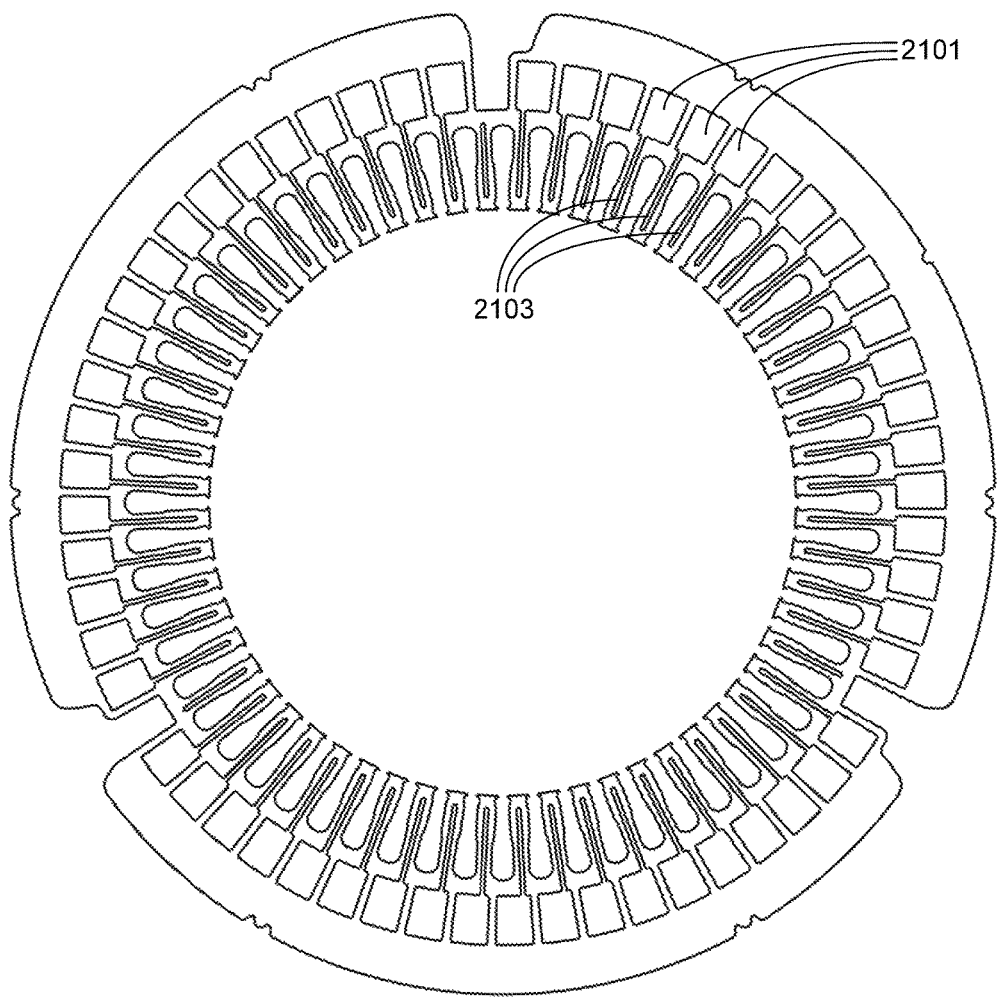
FIG. 21 provides an end view of one of the cooling manifolds shown in FIGS. 18 and 20.
Figure 22:
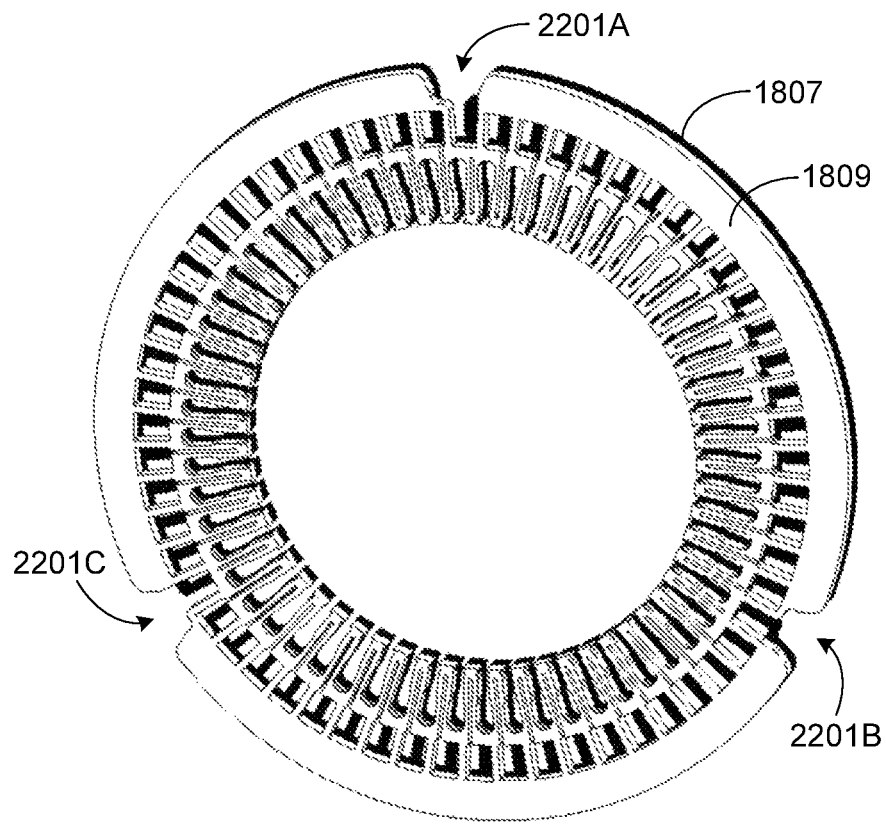
FIG. 22 provides a perspective view of the manifold assembly shown in FIGS. 18, 20 and 21 with the individual cooling manifolds aligned and properly positioned relative to one another prior to final assembly.
Figure 23:
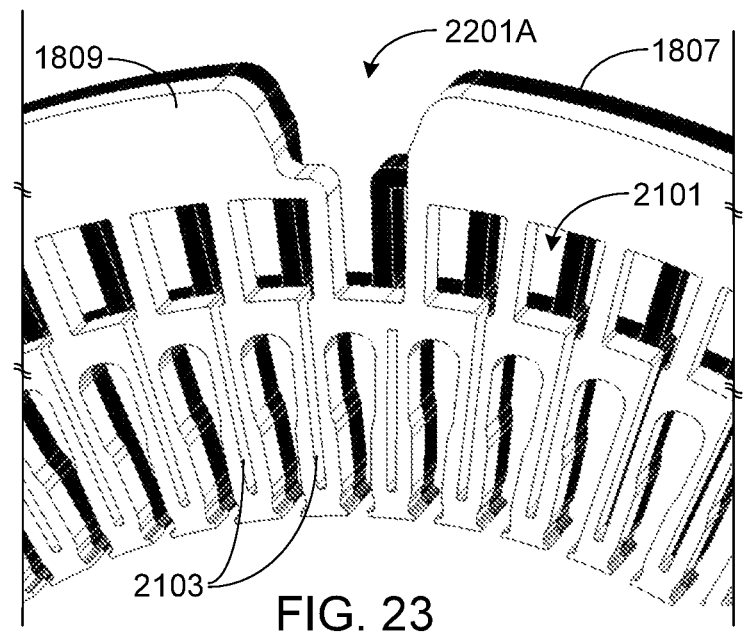
FIG. 23 provides an enlarged, perspective view of the manifold assembly shown in FIG. 22.
Figure 24:
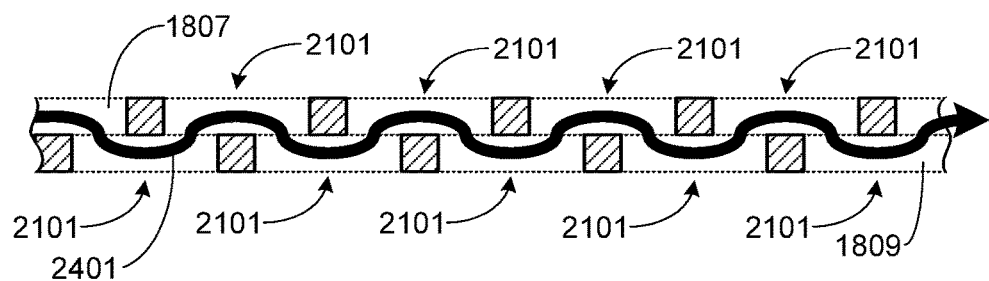
FIG. 24 provides a simplified cross-sectional view of a portion of the coolant manifold assembly shown in FIGS. 18-23.
Figure 25:
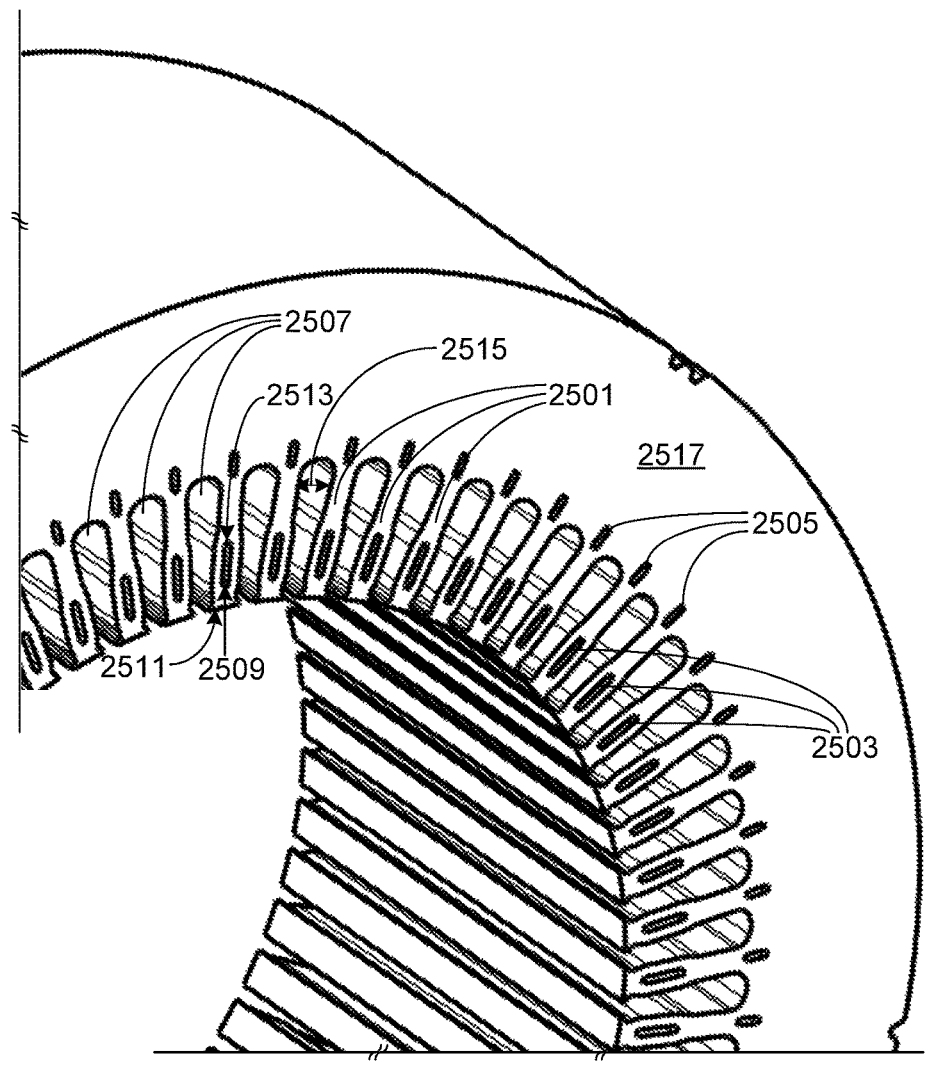
FIG. 25 provides an enlarged, perspective view of a portion of the stator along with the axial cooling channels shown in FIGS. 18-23.

FIG. 20 provides an enlarged, perspective view of portions of manifolds 1807 and 1809; FIG. 21 provides an end view of manifold 1807 taken from end portion 1803 (alternately, FIG. 21 provides an end view of manifold 1809 taken from end portion 1801); FIG. 22 provides a perspective view of manifold assembly 1805 in which manifolds 1807 and 1809 have been properly positioned relative to one another prior to final assembly; FIG. 23 provides an enlarged view of a portion of the manifold assembly shown in FIG. 22; FIG. 24 provides a simplified cross-sectional view of a portion of the coolant manifold assembly; and FIG. 25 provides an enlarged, perspective view of a portion of the stator along with the axial cooling channels shown in FIGS. 18-23. In the preferred embodiment, and as shown in FIGS. 18-25, coolant manifold portions 1807 and 1809 are identical to one another. To achieve the desired coolant flow path, during assembly one of the coolant manifolds is 'flipped' or 'reversed' relative to the other coolant manifold (i.e., one of the coolant manifolds is turned over such that the front surface of one coolant manifold is the rear surface of the second coolant manifold). By reversing one of the coolant manifolds prior to alignment and assembly, the coolant entering the manifold assembly via one manifold port 2201 (e.g., port 2201A) will exit the manifold assembly via a different manifold port 2201 (e.g., port 2201B). As shown in FIGS. 22 and 23, after manifold alignment the coolant apertures 2201 that are fabricated into each manifold are offset from one another. This aperture offset causes the coolant entering one manifold port 2201 (e.g., port 2201A) to serpentine through apertures 2101, specifically alternating between the apertures 2101 in one manifold and the apertures 2101 in the other manifold, before being expelled through another manifold port 2201 (e.g., port 2201B). FIG. 24 provides a simplified cross-sectional view of a portion of the coolant manifold assembly 1805 through apertures 2101, this view schematically illustrating the serpentine pattern 2401 of the coolant.

Manifold apertures 2101 serve two purposes. First and as described above, due to apertures 2101 of manifold 1807 being offset from apertures 2101 of manifold 1809, the coolant is forced to serpentine through the apertures after entering the coolant manifold assembly via a port 2201. Second, fluidly coupled to each aperture 2101 is a coolant passageway 2103 that allows coolant to flow from the aperture to the axial cooling channels fabricated into stator portions 1801 and 1803. Therefore while a portion of the coolant flows in a serpentine pattern through the apertures, a second portion of the coolant flows through coolant passageways 2103 and through the axial cooling channels before exiting both ends of the stator and flowing over the end windings as shown in FIG. 12. As in the prior embodiments, by locating the manifold at or near the center of the stator, the coolant is pumped outwardly from the stator center to both ends of the stator assembly. Additionally, by aligning coolant passageways 2103 as shown, coolant is simultaneously distributed to both stator end portions 1801 and 1803.

While cooling manifold 1805 may be used with any of a variety of axial cooling channels, for example axial cooling channels such as those described above and/or shown in FIGS. 3-7, preferably manifold 1805 is used with the axial cooling channels shown in FIGS. 18, 19 and 25. In this configuration, associated with each stator tooth 2501 is a pair of axial cooling channels 2503 and 2505. Each axial cooling channel 2503 is centered in a corresponding stator tooth 2501 and equidistantly spaced between adjacent stator slots 2507. In cross-section, each axial cooling channel 2503 is thin and long, preferably with a width of approximately 1 millimeter. The innermost edge 2509 of each cooling channel 2503 is positioned at a sufficient distance from the corresponding inner tooth edge 2511 to maintain a sufficiently low magnetic saturation while insuring the structural integrity of the tooth. Each cooling channel 2503 extends away from the cylindrical axis of the stator such that the outermost channel edge 2513 is located near the mid-point of the corresponding stator tooth. By utilizing a cooling channel length that is substantially less than the stator tooth length, the width 2515 of the slots can be made larger, thus providing more space for the stator windings.

Due to the limited length of axial cooling channels 2503, the inventors have found it preferable to include a secondary set of axial cooling channels 2505 in order to further improve the cooling capabilities of the system. In this embodiment axial cooling channels 2505, which are preferably smaller than channels 2503, extend at least partially into the stator yoke 2517. By minimizing the size of channels 2505 as well as the degree to which they extend into the yoke, their impact on the magnetic flux in the stator can be minimized. Preferably axial cooling channels 2503 and 2505 are co-aligned such that a single slot-shaped coolant passageways 2103 is fluidly coupled to both channels as shown.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of cooling an electric motor, wherein a stator of said electric motor is divided into a first stator portion and a second stator portion, wherein a coolant manifold assembly is integrated into said stator between said first stator portion and said second stator portion, and wherein said coolant manifold assembly is divided into a first coolant manifold and a second coolant manifold, said method comprising:

circulating a coolant through said coolant manifold assembly via a plurality of manifold ports, wherein a first portion of said coolant flows in a serpentine pattern between a first plurality of apertures corresponding to said first coolant manifold and a second plurality of apertures corresponding to said second coolant manifold, wherein a second portion of said coolant flows through a first plurality of coolant passageways corresponding to said first coolant manifold and fluidly coupled to said first plurality of apertures and through a second plurality of coolant passageways corresponding to said second coolant manifold and fluidly coupled to said second plurality of apertures, and wherein said second portion of said coolant flows through said first and second pluralities of coolant passageways and through a plurality of axial cooling channels integrated into a plurality of stator teeth, said plurality of stator teeth corresponding to said stator of said electric motor, wherein an axis corresponding to each of said axial cooling channels is parallel with a cylindrical axis corresponding to said stator.

2. The method of claim 1, wherein during said circulating step a first amount of said second portion of said coolant flows through a first end portion of each of said plurality of axial cooling channels and directly over a first plurality of end windings, and wherein a second amount of said second portion of said coolant flows through a second end portion of each of said plurality of axial cooling channels and directly over a second plurality of end windings.

3. The method of claim 1, said circulating step further comprising circulating said coolant through a heat exchanger.

4. The method of claim 1, wherein a first axial cooling channel of a pair of axial cooling channels of said plurality of axial cooling channels is integrated completely within a corresponding stator tooth of said plurality of stator teeth, and wherein a second axial cooling channel of said pair of axial cooling channels of said plurality of axial cooling channels is at least partially integrated within a yoke of said stator.

5. The method of claim 4, wherein said second axial cooling channel of said pair of axial cooling channels of said plurality of axial cooling channels is completely integrated within said yoke of said stator.

6. The method of claim 1, wherein said circulating step circulates said coolant with a mass flow rate in the range of 10 to 20 liters per minute.

\* \* \* \* \*